Sept. 19, 1967  F. L. STEEN  3,343,036

STATIC UNDERVOLTAGE CIRCUIT

Filed Dec. 17, 1964

INVENTOR:
FLOYD L. STEEN,
BY Albert S. Richardson Jr.
ATTORNEY

United States Patent Office 3,343,036
Patented Sept. 19, 1967

3,343,036
STATIC UNDERVOLTAGE CIRCUIT
Floyd L. Steen, Lansdowne, Pa., assignor to General Electric Company, a corporation of New York
Filed Dec. 17, 1964, Ser. No. 419,079
12 Claims. (Cl. 317—31)

This invention relates to voltage sensing circuits and, more specifically, to static undervoltage responsive circuits.

While my invention is not necessarily restricted to any one application, it is particularly useful in undervoltage trip devices for circuit breakers employed in electric power distribution systems, where a circuit opening operation of the breaker is desired to disconnect a load from a source of power if the source voltage magnitude is below a predetermined critical level.

Electromechanical undervoltage devices of known design are less sensitive than required for some applications and are subject to mechanical malfunctions while in service. Furthermore, such devices have relatively high energy requirements, and this is often undesirable.

Therefore, low-energy static undervoltage devices have been proposed. But such static devices of reliable design have heretofore required separate control power supplies, such as a battery, which adds to the bulk and to the expense of the circuits.

It is a general object of my invention to provide a practical undervoltage circuit that avoids the shortcomings of the prior art.

Another object of my invention is the provision of a novel static undervoltage circuit that is self contained and does not require an auxiliary source of control power for successful operation.

It is still another object of my invention to provide a versatile static undervoltage circuit having a high operating reliability.

Briefly stated, in accordance with one aspect of my invention, I provide an energy storage means which is fully energized during a period of normal operation of a monitored electric power system and which, during an undervoltage condition in the system, is able to energize an electroresponsive device to thereby perform a predetermined control function. Sensing means is provided to cause the energy storage means to be abruptly discharged in response to the undervoltage condition, thereby changing the state of energization of the electroresponsive device, and timing means is optionally provided to introduce a delay in obtaining this result.

Other objects and features of my invention will be more fully understood from the following description of two embodiments of my invention and from the following drawings in which.

Figure 1:
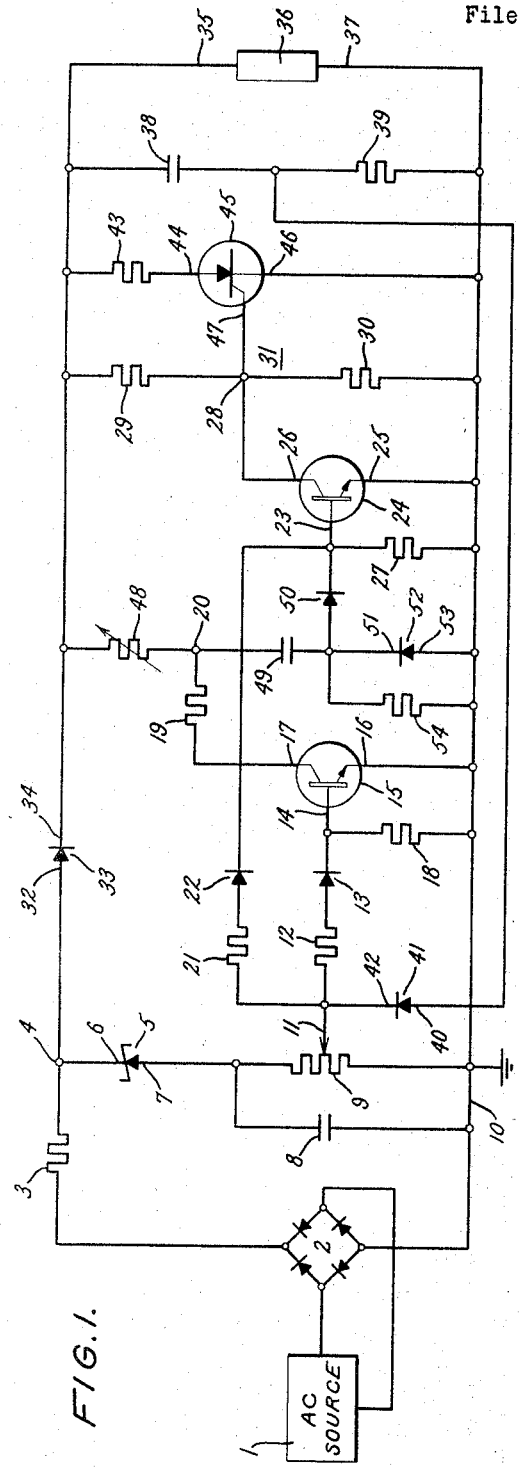
FIGURE 1 is a circuit diagram illustrating an embodiment of my invention having time delay means.

Referring to FIGURE 1, an electric power source having the magnitude of its output voltage monitored by the subject static undervoltage circuit is illustrated as an A-C source 1. The voltage from source 1, after rectification by a full-wave rectifier 2, is applied via a current limiting resistor 3 to a junction point 4 as shown.

A sensing means for detecting an undervoltage condition of the source voltage comprises a zener diode 5 having its cathode 6 connected to the relatively positive junction point 4 and having its anode 7 connected through a parallel circuit, comprising a smoothing capacitor 8 and a potentiometer 9 to a ground bus 10. The zener diode 5 will conduct current whenever the magnitude of the applied voltage exceeds the characteristic breakdown voltage level of this component. Other electronic components or circuits similarly capable of detecting an undervoltage condition can alternatively be used in conjunction with my invention, and such sensing means could be arranged if desired to respond to the lowest voltage of a polyphase source.

A slide wire 11 of the potentiometer 9 is connected through a current limiting resistor 12 and a diode 13 to the base electrode 14 of a transistor 15, having an emitter electrode 16 and a collector electrode 17. The emitter electrode 16 is connected directly to the ground bus 10, a relatively high impedance resistor 18 is connected between the base electrode 14 and the ground bus, and the collector electrode 17 is connected by way of a resistor 19 to a junction point 20.

The slide wire 11 of the potentiometer 9 is further connected through a current limiting resistor 21 and a diode 22 to a base electrode 23 of a transistor 24, having an emitter electrode 25 and a collector electrode 26. The emitter electrode 25 is connected directly to the ground bus 10, a relatively high impedance resistor 27 is connected between the base electrode 23 and the ground bus, and the collector electrode 26 is connected to a junction point 28 between resistors 29 and 30 which comprise a voltage divider 31.

As is shown in FIGURE 1, an anode 32 of an isolation diode 33 is connected to the junction point 4, while its cathode 34 is connected to a first terminal 35 of an electroresponsive device 36 having a second terminal 37 connected to the ground bus 10. Voltage regulating means may be connected between the cathode 34 and the ground bus 10 if desired. The electroresponsive device 36 is intended to represent any apparatus wherein a flow of current therethrough maintains the apparatus in one of two energization states. For example, a holding winding of a flux-shifting circuit breaker trip relay could be connected between the two terminals 35 and 37.

A circuit comprising an energy storage means 38 connected in series with a biasing resistor 39 is connected in parallel with the electroresponsive device 36. The energy storage means 38 is shown as a capacitor in the present embodiment of my invention. The capacitor 38 is energized by the voltage of the source 1 to which it is connected by means of the unidirectionally conductive diode 33 and rectifier 2. An anode 40 of a feedback diode 41 is connected to the junction between the capacitor 38 and the resistor 39, while the cathode 42 of the feedback diode 41 is connected to the slide wire 11 of the potentiometer 9.

Shunting the capacitor 38 is a circuit for abruptly discharging it. This circuit includes a current limiting resistor 43 connected between the cathode 34 of the isolation diode 33 and one terminal 44 of a controlled impedance means 45 which, in the present embodiment of my invention, comprises a normally inactive semiconductor device such as a silicon controlled rectifier (SCR). A cathode 46 of the SCR 45 is connected to ground 10, and its gate lead 47 is connected to the junction point 28 of the voltage divider 31.

Activation of the SCR 45 is controlled by adjustable timing means including the transistor 24, a variable resistor 48 connected between the cathode 34 of the diode 33 and the junction point 20, and a timing capacitor 49 connected to the junction point 20 and through a diode 50 to the base electrode 23 of the transistor 24. A cathode 51 of a diode 52 is connected to the junction between the capacitor 49 and the diode 50, while the anode 53 of the diode 52 is connected to ground 10. If desired, a resistor 54 can be connected in parallel with the diode 52 as shown. Energy for the timing means operation is supplied by the capacitor 38 which is connected thereto.

In operation, the voltage sensing means comprising the zener diode 5 conducts current from the junction point 4 whenever the magnitude of the output voltage from A-C source 1, rectified by the rectifier circuit 2, as above the predetermined voltage level, determined by the breakdown voltage level of the zener diode 5. The capacitor 8, which is charged by the current which flows through the zener diode 5, is of such a size that it can only supply current through potentiometer 9 during the short interval between successive peaks of the rectified output voltage from the A-C source 1, when the magnitude of a portion of the output voltage wave is below the zener breakdown voltage level. Therefore, current flows continuously through potentiometer 9 until the source voltage peak magnitude falls below a predetermined critical level.

A portion of this current flows from the slide wire 11 of the potentiometer 9 through the resistor 12 and the diode 13 to the base electrode 14 of the transistor 15 and through the resistor 21 and the diode 22 to the base electrode of the transistor 24 to keep the transistors 15 and 24 normally turned on. Since each of the transistors has a low collector-emitter resistance when turned on, the transistor 15 shunts current from the timing capacitor 49 to preclude this capacitor from charging. Similarly, the transistor 24 shunts current from the resistor 30 to prevent the gate-cathode circuit of the SCR 45 from becoming forward biased.

While the rectified output voltage from source 1 is above the predetermined voltage level, the isolation diode 33 couples current from the junction point 4 through the electroresponsive device 36 to maintain the electroresponsive 36 in a first of two energization states. The isolation diode 33 also couples charging current for capacitor 38.

At start up, when voltage first appears at the previously deenergized junction point 4, the capacitor 38 will immediately begin charging.

A portion of the initial charging current flows through the feedback diode 41 to the slide wire 11 of the potentiometer 9 and through the resistor 12 and the diode 13 to the base electrode 14, thereby quickly turning on the transistor 15. Simultaneously current flows through the resistor 21 and the diode 22 to the base electrode 23 to turn on the transistor 24, thereby preventing premature activation of the SCR 45 during the initial cycle of applied voltage. Soon the voltage at point 4 will exceed the breakdown potential of zener diode 5, and the current through potentiometer 9 then maintains transistors 15 and 24 in their conductive states.

When the magnitude of the rectified output voltage from the source 1 falls below the predetermined critical level, the zener diode 5 stops conducting current and thus the transistor 15 is turned off and no longer shunts current from the timing capacitor 49. This initiates operation of the timing means. Since the capacitor 38 is charged to a voltage above the zener breakdown voltage level, the isolation diode 33 is now reverse biased and blocks capacitor discharge current. Capacitor 38 begins to discharge through the electroresponsive device 36 and for the time being maintains it in its first energization state. The capacitor 38 also discharges through the variable resistor 48 to charge the time delay capacitor 49.

The charging current for capacitor 49 flows through the diode 50 to the base electrode 23 to keep the transistor 24 turned on. Upon the expiration of a given length of time after this operation is initiated, depending on the selection and setting of resistor 48, the magnitude of the charging current for the capacitor 49 will fall below that needed to keep the transistor 24 turned on. The transistor 24 is then turned off and no longer provides a path of negligable impedance across the resistor 30. Therefore, the gate-cathode circuit of the SCR 45 is forward biased and current from capacitor 38 flows through resistor 29 and gate electrode 47 to activate or turn on the SCR 45. This switching of the SCR 45 from its relatively high impedance state to a low impedance state abruptly discharges the capacitor 38 and thus stops the flow of current through the electroresponsive device 36, thereby changing the state of energization thereof.

The operation of the time delay means will terminate if the magnitude of the rectified output voltage should attain the zener breakdown voltage level once again, before the magnitude of the charging current of capacitor 49 falls below that needed to keep the transistor 24 turned on. In this instance, current resumes flowing through the zener diode 5, the potentiometer 9, the slide wire 11, the resistor 21, and the diode 22 to the base electrode 23 to keep the transistor 24 turned on so that the gate-cathode circuit of the SCR 45 remains reverse biased. At the same time the transistor 15 is turned on, and the diodes 50 and 52 preclude the base-emitter junction of the transistor 24 from being reverse biased when the partially charged timing capacitor 49 discharges through the transistor 15.

Figure 2:
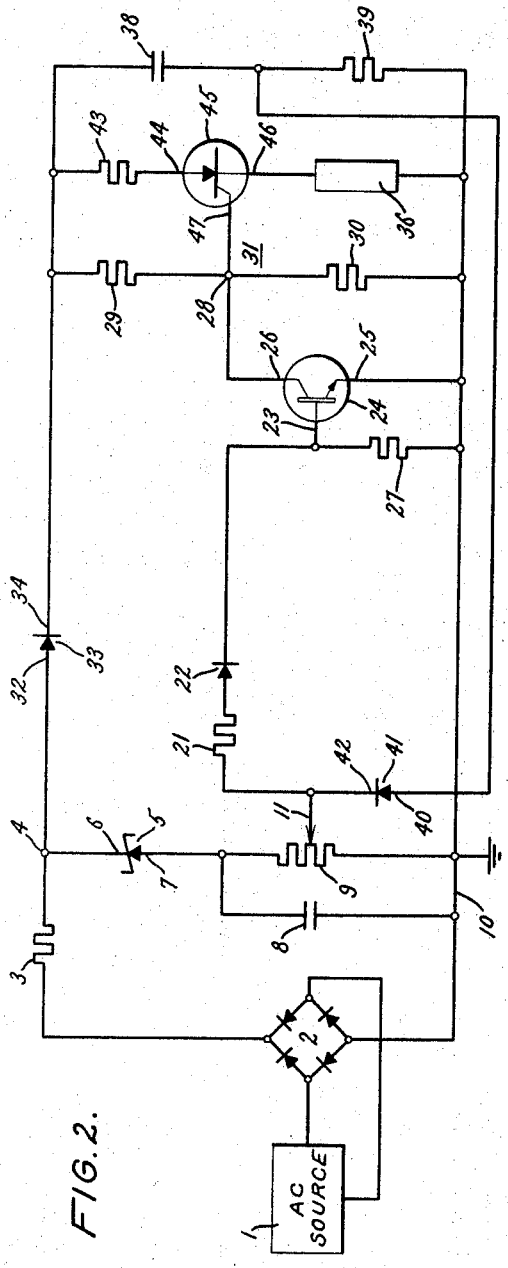
FIGURE 2 is a circuit diagram of an embodiment of my invention without the time delay means.

The circuit shown in FIGURE 2 is a second embodiment of my invention which comprises a static undervoltage responsive circuit without the timing means. The electroresponsive device 36 is here connected between the cathode 46 of the SCR 45 and the ground 10. This device may comprise, for example, a control circuit of a current responsive circuit breaker trip relay. Except for the elimination of the time delay circuit including the variable resistor 48, the capacitor 49, the transistor 15, and the circuitry associated therewith, the circuit components shown in FIGURE 2 are similar to those of FIGURE 1.

Referring to the circuit diagram shown in FIGURE 2, when the magnitude of the rectified output voltage from the A-C source 1 is above the breakdown voltage level of the zener diode 5, zener diode 5 conducts current from the junction point 4, through the potentiometer 9 and the slide wire 11 and through the resistor 21 and the diode 22 to the base electrode 23 to keep the transistor 24 turned on. Therefore, no gating signal can be applied to the SCR 45 and the SCR is inactive or turned off. The isolation diode 33 conducts current to charge the capacitor 38. The electroresponsive device 36 is now in a first energization state caused when no current is flowing therethrough.

When the magnitude of the output voltage falls below the zener breakdown voltage level, the zener diode 5 stops conducting current and thus the transistor 24 is turned off. Consequently the gate-cathode circuit of the SCR 45 becomes forward biased by the voltage divider 31, current flowing from the capacitor 38 through the resistor 29 and the gate electrode 47 to turn on the SCR 45. The SCR 45 is then operative to abruptly change its impedance state to one enabling the capacitor 38 to discharge through the electroresponsive device 36 to change the state of energization of this device. Thus the electroresponsive device 36 is energized in response to the conduction of capacitor discharge current by the SCR 45.

My invention is not limited to the embodiments shown herein or to the specific apparatus discussed above. To the contrary, my invention is capable of numerous modifications, as will be recognized by those skilled in the art, without deviating from the scope thereof, and it should not be limited in any sense except as defined by the following claims:

What I claim as new and desire to secure by Letters Patent of the United States is:

1. In a time delay circuit for changing the state of energization of an electroresponsive device in delayed response to the magnitude of the voltage of a voltage source falling below a predetermined level, wherein the circuit has timing means and means for initiating operation of said timing means when the magnitude of the voltage falls below said predetermined level, the improvement comprising, electric energy storage means for supplying energy to said electroresponsive device, means for connecting said energy storage means to said source for energization thereby, and means controlled by said timing means for abruptly discharging said energy storage means, thereby changing the state of energization of said electroresponsive device, upon the expiration of a predetermined length of time after operation of the timing means is initiated.

2. A circuit according to claim 1 wherein said discharging means includes a controlled semiconductor device shunting said energy storage means.

3. A circuit according to claim 1 wherein said energy storage means comprises a capacitor and said connecting means includes a diode poled to block capacitor discharge current.

4. A circuit according to claim 3 wherein said capacitor is connected to said timing means for supplying energy thereto.

5. In a circuit for changing the state of energization of an electroresponsive device in response to the magnitude of the voltage of a voltage source falling below a predetermined level, said circuit having sensing means for detecting when the magnitude of said voltage falls below said predetermined level, the improvement comprising, electric energy storage means for supplying energy to said electroresponsive device, means for connecting said storage means to said source for energization thereby, means controlled by said sensing means for discharging said storage means and thereby changing the state of energization of said electroresponsive device in response to said sensing means detecting a fall of said source voltage magnitude below said predetermined level, and means responsive to initial energization of said storage means for preventing said discharging means from prematurely discharging said storage means.

6. A circuit according to claim 5 wherein said energy storage means comprises a capacitor and said connecting means includes a diode poled to block capacitor discharge current.

7. A circuit according to claim 5 wherein said discharging means includes at least one normally inactive controlled semiconductor device shunting said energy storage means, activation of said semiconductor device being controlled by said sensing means.

8. In a circuit for changing the state of energization of an electroresponsive device at a predetermined time after the magnitude of the voltage of a voltage source falls below a predetermined level, wherein the circuit has adjustable timing means and means including a zener diode for initiating operation of said time delay means when said voltage magnitude falls below said predetermined level, the improvement comprising capacitor means adapted to be connected to said source for storing electric energy and for supplying said energy to said electroresponsive device and to said timing means, a controlled impedance device shunting said capacitor means to discharge said capacitor means, thereby changing the state of energization of said electroresponsive device, when switched from a relatively high impedance state to a low impedance state, and means including said timing means for switching said impedance device to its low impedance state at said predetermined time after operation of said timing means is initiated.

9. A circuit according to claim 8 wherein said electroresponsive device comprises a flux-shifting relay having a holding winding connected across said capacitor means.

10. A circuit according to claim 8 wherein said electroresponsive device comprises a current responsive device having a control circuit connected for energization in response to the conduction of capacitor discharge current by said impedance device.

11. In a circuit for energizing a normally de-energized electroresponsive device after the magnitude of the voltage of a voltage source falls below a predetermined level, said circuit having sensing means including a zener diode for detecting when the magnitude of said voltages falls below said predetermined level, the improvement comprising, a capacitor for storing electric energy and for supplying said energy to said electroresponsive device, unidirectionally conductive means connecting said capacitor to said source for energization by the source voltage, a controlled impedance device connected to said sensing means, the last-mentioned device being operative to abruptly change its impedance state in response to the sensing means detecting a fall of source voltage magnitude below said predetermined level, and means interconnecting said impedance device, said capacitor, and said electroresponsive device so that the capacitor will discharge through said electroresponsive device, thereby energizing the same, upon operation of said impedance device.

12. A circuit according to claim 11 wherein said sensing means includes timing means for delaying operation of said controlled impedance device when a fall of source voltage magnitude below said predetermined level is first detected.

References Cited

UNITED STATES PATENTS

| 3,001,100 | 9/1961 | Schuh et al. | 317—31 |
| 3,213,323 | 10/1965 | Circle | 317—33 |
| 3,243,796 | 3/1966 | Harmon et al. | |

MILTON O. HIRSHFIELD, *Primary Examiner.*

R. V. LUPO, *Assistant Examiner.*